US008072987B1

(12) United States Patent
Madnani et al.

(10) Patent No.: US 8,072,987 B1
(45) **Date of Patent: *Dec. 6, 2011**

(54) FULL ARRAY NON-DISRUPTIVE DATA MIGRATION

(75) Inventors: Kiran Madnani, Framingham, MA (US); Adi Ofer, Framingham, MA (US); Jeffrey A. Brown, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 694 days.

This patent is subject to a terminal disclaimer.

(21) Appl. No.: 11/241,165

(22) Filed: Sep. 30, 2005

(51) Int. Cl.
*H04L 12/28* (2006.01)
*H04L 12/54* (2006.01)
*G06F 13/00* (2006.01)

(52) U.S. Cl. ..................... 370/395.7; 370/428; 711/114; 711/165

(58) Field of Classification Search ........................ None
See application file for complete search history.

(56) References Cited

U.S. PATENT DOCUMENTS 5,247,632 A 9/1993 Newman
6,363,462 B1 3/2002 Bergsten
6,421,711 B1 7/2002 Blumenau et al.
6,477,632 B1 * 11/2002 Kikuchi ........................ 711/203
6,598,174 B1 7/2003 Parks et al.
6,714,952 B2 3/2004 Dunham et al.
6,839,750 B1 1/2005 Bauer et al.
7,051,101 B1 5/2006 Dubrovsky et al.
7,124,143 B2 10/2006 Matsunami et al.
7,219,092 B2 5/2007 Ikegaya et al.
7,334,029 B2 2/2008 Shiga et al.
7,398,421 B1 7/2008 Limaye et al.
2003/0131182 A1 7/2003 Kumar et al.
2003/0188218 A1 10/2003 Lubbers et al.
2004/0024964 A1 * 2/2004 Taninaka et al. .............. 711/114
2004/0054618 A1 3/2004 Chang et al.
2004/0139240 A1 7/2004 DiCorpo et al.
2004/0151188 A1 8/2004 Mavelli et al.

(Continued)

FOREIGN PATENT DOCUMENTS

EP 1130514 A2 9/2001

OTHER PUBLICATIONS

Madnani, et al.; U.S. Appl. No. 11/318,756, filed on Dec. 27, 2005; 77 pages.

(Continued)

*Primary Examiner* — Huy Vu
*Assistant Examiner* — Brandon Renner
(74) *Attorney, Agent, or Firm* — Guerin & Rodriguez, LLP

(57) ABSTRACT

Source and destination fiber channel devices are coupled to a fiber channel fabric. Hosts communicate with the fiber channel devices using fiber channel addresses. All data is copied from the source fiber channel device to the destination fiber channel device. Source port names and LUN names are exchanged with destination port names and LUN names so that the source device has the destination port and LUN names and the destination device has the source port and LUN names. The fabric reloads its name server database for use by the host(s) so that the database associates the source port and LUN names with the destination port and LUN names and the destination port and LUN names with the source port and LUN names. The names known to the host have not changed and the destination fiber channel device now appears to the host as the source fiber channel device.

22 Claims, 16 Drawing Sheets

U.S. PATENT DOCUMENTS

| | | | | |
|---|---|---|---|---|
| 2004/0250021 | A1 | 12/2004 | Honda et al. | |
| 2005/0010688 | A1 | 1/2005 | Murakami et al. | |
| 2005/0108476 | A1* | 5/2005 | Tanaka et al. | 711/114 |
| 2005/0193168 | A1* | 9/2005 | Eguchi et al. | 711/114 |
| 2005/0243611 | A1 | 11/2005 | Lubbers et al. | |
| 2005/0251620 | A1 | 11/2005 | Matsunami et al. | |
| 2006/0041595 | A1 | 2/2006 | Taguchi et al. | |
| 2006/0047930 | A1* | 3/2006 | Takahashi et al. | 711/162 |
| 2006/0064466 | A1 | 3/2006 | Shiga et al. | |
| 2006/0072580 | A1* | 4/2006 | Dropps et al. | 370/395.7 |
| 2006/0085607 | A1* | 4/2006 | Haruma | 711/161 |
| 2006/0107010 | A1 | 5/2006 | Hirezaki | |
| 2006/0129772 | A1 | 6/2006 | Kawamura et al. | |
| 2006/0168415 | A1* | 7/2006 | Ishii et al. | 711/165 |
| 2006/0182050 | A1 | 8/2006 | Dohm | |
| 2006/0242377 | A1* | 10/2006 | Kanie et al. | 711/165 |
| 2007/0220310 | A1 | 9/2007 | Sharma et al. | |
| 2007/0266212 | A1 | 11/2007 | Uchikado et al. | |
| 2007/0291785 | A1 | 12/2007 | Sharma et al. | |
| 2008/0189700 | A1 | 8/2008 | Schmidt et al. | |

OTHER PUBLICATIONS

Ofer, et al.; U.S. Appl. No. 11/427,664, filed on Jun. 29, 2006; 76 pages.

Madnani, et al.; U.S. Appl. No. 11/427,677, filed on Jun. 29, 2006; 75 pages.

Madnani, et al.; U.S. Appl. No. 11/427,685, filed on Jun. 29, 2006; 74 pages.

Ofer, et al.; U.S. Appl. No. 11/427,699, filed on Jun. 29, 2006; 79 pages.

Office Action mailed Sep. 30, 2008 for U.S. Appl. No. 11/318,756.

Office Action mailed Feb. 23, 2009 for U.S. Appl. No. 11/427,664.

Notice of Allowance mailed Sep. 19, 2008 for U.S. Appl. No. 11/427,677.

Notice of Allowance mailed Sep. 24, 2008 for U.S. Appl. No. 11/427,685.

Notice of Allowance mailed Sep. 29, 2008 for U.S. Appl. No. 11/427,699.

Final Office Action mailed Dec. 15, 2009 for U.S. Appl. No. 11/318,756.

Final Office Action mailed Nov. 9, 2009 for U.S. Appl. No. 11/427,664.

Office Action mailed Oct. 2, 2009 for U.S. Appl. No. 11/771,604.

Office Action mailed Oct. 26, 2009 for U.S. Appl. No. 11/771,655.

Office Action mailed Jun. 18, 2009 for U.S. Appl. No. 11/318,756.

Office Action mailed Jun. 29, 2010 for U.S. Appl. No. 11/318,756.

Final Office Action mailed Jul. 2, 2010 for U.S. Appl. No. 11/771,604.

Final Office Action mailed Sep. 3, 2010 for U.S. Appl. No.11/771,655.

Office Action mailed Dec. 8, 2010 for U.S. Appl. No. 11/318,756.

Office Action mailed Apr. 15, 2011 for U.S. Appl. No. 11/318,756, 7 pages.

Office Action mailed Apr. 25, 2011 for U.S. Appl. No. 11/771,655, 22 pages.

* cited by examiner

42

| PORT NAME | PORT ID |
|---|---|
| A | 0 |
| B | 1 |
| C | 2 |
| D | 3 |

| LUN NAME | PORT ID | LUN # |
|---|---|---|
| m | 0 | 40 |
| n | 0 | 41 |
| p | 0 | 42 |
| q | 1 | 50 |
| r | 1 | 51 |
| s | 1 | 52 |
| t | 2 | 60 |
| u | 2 | 61 |
| v | 2 | 62 |
| x | 3 | 70 |
| y | 3 | 71 |
| z | 3 | 72 |

| PORT NAME | PORT ID |
| --- | --- |
| A | 0 |
| B | 1 |
| C | 2 |
| D | 3 |

| PORT NAME | PORT ID |
| --- | --- |
| A | 2 |
| B | 3 |
| C | 0 |
| D | 1 |

| LUN NAME | PORT ID | LUN # |
|---|---|---|
| m | 0 | 40 |
| n | 0 | 41 |
| p | 0 | 42 |
| q | 1 | 50 |
| r | 1 | 51 |
| s | 1 | 52 |
| t | 2 | 60 |
| u | 2 | 61 |
| v | 2 | 62 |
| x | 3 | 70 |
| y | 3 | 71 |
| z | 3 | 72 |

| LUN NAME | PORT ID | LUN # |
|---|---|---|
| m | 2 | 40 |
| n | 2 | 41 |
| p | 2 | 42 |
| q | 3 | 50 |
| r | 3 | 51 |
| s | 3 | 52 |
| t | 0 | 60 |
| u | 0 | 61 |
| v | 0 | 62 |
| x | 1 | 70 |
| y | 1 | 71 |
| z | 1 | 72 |

| PORT NAME | NEW PORT NAME |
|---|---|
| A | C |
| B | D |

| LUN NAME | NEW LUN NAME |
|---|---|
| m | t |
| n | u |
| p | v |
| q | x |
| r | y |
| s | z |

| LUN NUMBER | NEW LUN NUMBER |
|---|---|
| 40 | 60 |
| 41 | 61 |
| 42 | 62 |
| 50 | 70 |
| 51 | 71 |
| 52 | 72 |

| PORT NAME | NEW PORT NAME |
|---|---|
| C | A |
| D | B |

| LUN NAME | NEW LUN NAME |
|---|---|
| t | m |
| u | n |
| v | p |
| x | q |
| y | r |
| z | s |

| LUN NUMBER | NEW LUN NUMBER |
|---|---|
| 60 | 40 |
| 61 | 41 |
| 62 | 42 |
| 70 | 50 |
| 71 | 51 |
| 72 | 52 |

FIG. 21

FULL ARRAY NON-DISRUPTIVE DATA MIGRATION

FIELD OF THE INVENTION

The present invention relates generally to the field of storage systems, and particularly to migration of an existing storage array to a new storage array.

BACKGROUND OF THE INVENTION

Today's enterprise data centers store ever-larger amounts of business critical data that must be immediately and continuously available, and highly reliable. Any down time for a storage system is considered unacceptable. Many precautions are taken in storage systems to protect against the effects of failures so that down time is avoided. However, from time to time a storage system, such as a storage array, must be upgraded or replaced.

In order to replace a current storage array with a new storage array, all the data and connections on the current storage array must be migrated to the new array. Then the storage system requires re-initialization, and host systems must be reconfigured. This requires at least some down time to complete; thus, host applications lose access to the storage array for some amount of time. Interruption of critical applications is unacceptable.

What is needed is a way to upgrade or replace storage arrays in a manner that is transparent to the host systems so that host applications are not interrupted by the upgrade or replacement.

SUMMARY OF THE INVENTION

In accordance with the principles of the invention, a storage array can be replaced with a new storage array in a manner that is transparent to host applications. The invention is designed for use in a system that employs a transport protocol for transferring information between devices. Each device has one or more device ports. Each device port has a unique name associated with it, and an address that is used for routing information between the devices. An example of such a transport is Fibre Channel, commonly used in storage systems for communications between hosts and storage arrays.

A fibre channel fabric has a database that associates fibre channel names and fibre channel addresses of fibre channel ports coupled to it. One or more hosts use fibre channel addresses to communicate with fibre channel devices. The database is used by the host(s) for learning fibre channel name and address associations. In accordance with the invention, a source fibre channel device has one or more source ports coupled to the fibre channel fabric, each source port having a source port name and a source port address. A destination fibre channel device has one or more destination ports coupled to the fibre channel fabric, each destination port having a destination port name and a destination port address. The invention employs logic for copying all data resident on the source fibre channel device to the destination fibre channel device. The invention further includes logic for exchanging the source port names with the destination port names so that the source ports have the destination port names and the destination ports have the source port names. Further logic causes the fabric to reload its name server database for use by the host(s) so that the database associates the source port names with the destination port addresses and the destination port names with the source port addresses, such that the names known by the host have not changed and the destination fibre channel device now appears to the host as the source fibre channel device.

The source and destination fibre channel devices are preferably storage arrays. The source storage array exports source LUNs for use by the host(s). Each source LUN has a source LUN name and source LUN number. The destination storage array exports destination LUNs for use by the hosts, each destination LUN having a destination LUN name and a destination LUN number. The logic for exchanging further includes logic for exchanging the source LUN names with the destination LUN names so that the source LUNs have the destination LUN names and the destination LUNs have the source LUN names. The destination LUNs thus appear to the host(s) as the source LUNs.

The source and destination arrays preferably include source and destination port and LUN translation tables, for use in exchanging the source and destination port and LUN names. Source and LUN translation tables are enabled by source and LUN controllers via a handshake protocol.

The invention causes the names of the array ports and the names of LUNs for a source and destination storage array to be exchanged so that the destination array now appears to the hosts as the source array. This enables host communication with the devices to continue uninterrupted, thereby eliminating application downtime for an array upgrade or replacement.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 3 is a representation of a name server database table resident in the fabric.

FIG. 4 is a representation of the mapping of LUNs to a group of disks.

FIG. 8 is a representation of a name server database table before the name and number exchange between the arrays.

FIG. 9 is a representation of a name server database table after the name and number exchange between the arrays.

FIG. 10 is a representation of a LUN table before the LUN names are exchanged between the arrays.

FIG. 11 is a representation of a LUN table after the LUN names are exchanged between the arrays.

FIG. 15 is an example of a port name translation table in the source array.

FIG. 16 is an example of a LUN name translation table in the source array.

FIG. 17 is an example of a LUN number translation table in the source array.

FIG. 19 is an example of a port name translation table in the destination array.

FIG. 20 is an example of a LUN name translation table in the destination array.

FIG. 21 is an example of a LUN number translation table in the destination array.

DETAILED DESCRIPTION OF EXEMPLARY EMBODIMENTS

Figure 1:
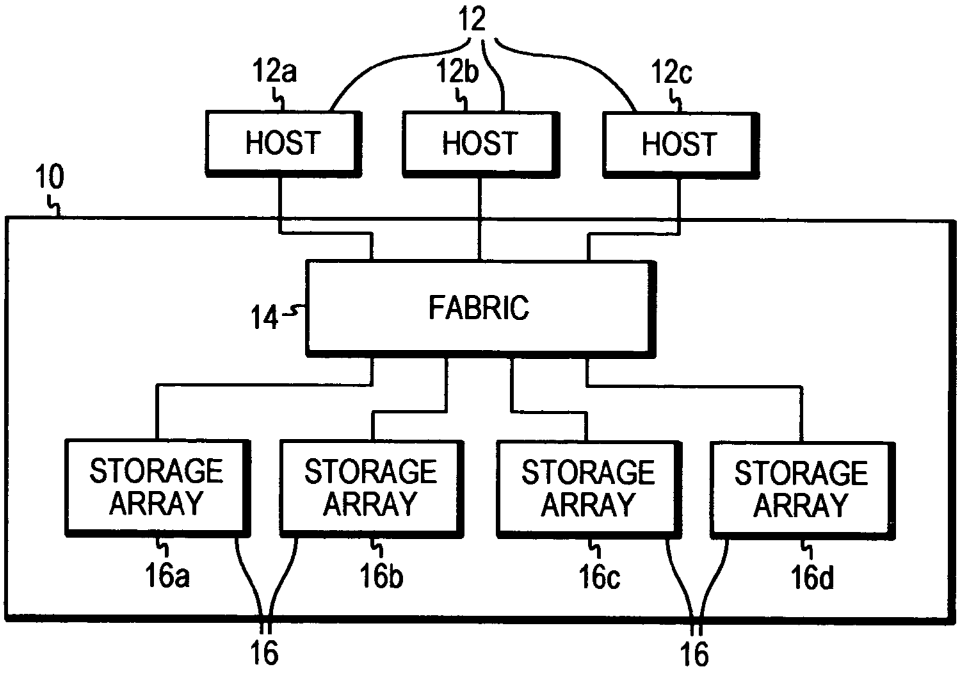
FIG. 1 is a representation of a storage area network and hosts. The storage area network includes multiple Fibre Channel arrays coupled to a Fibre Channel fabric.

In FIG. 1 there is shown a functional block diagram of an exemplary storage area network 10 in which the invention can be implemented. The storage area network 10 employs a Fibre Channel fabric topology. Fibre Channel is a high speed serial transport used in storage systems. It is described in a series of standards that can be found at *X3T9*.3 *Task Group of ANSI: Fibre Channel Physical and Signaling Interface* (*FC-PH*), *Rev.* 4.2 *Oct.* 8, 1993. Hosts 12, shown individually as 12*a*, 12*b*, and 12*c* are coupled to a Fibre Channel "fabric" in the storage system, herein shown as a switch 14. Storage arrays 16, shown individually as 16*a-d*, are also coupled to the switch 14. The hosts 12 communicate with any of the arrays 16 via a cross-point Fibre Channel connection through the switch 14.

Figure 2:
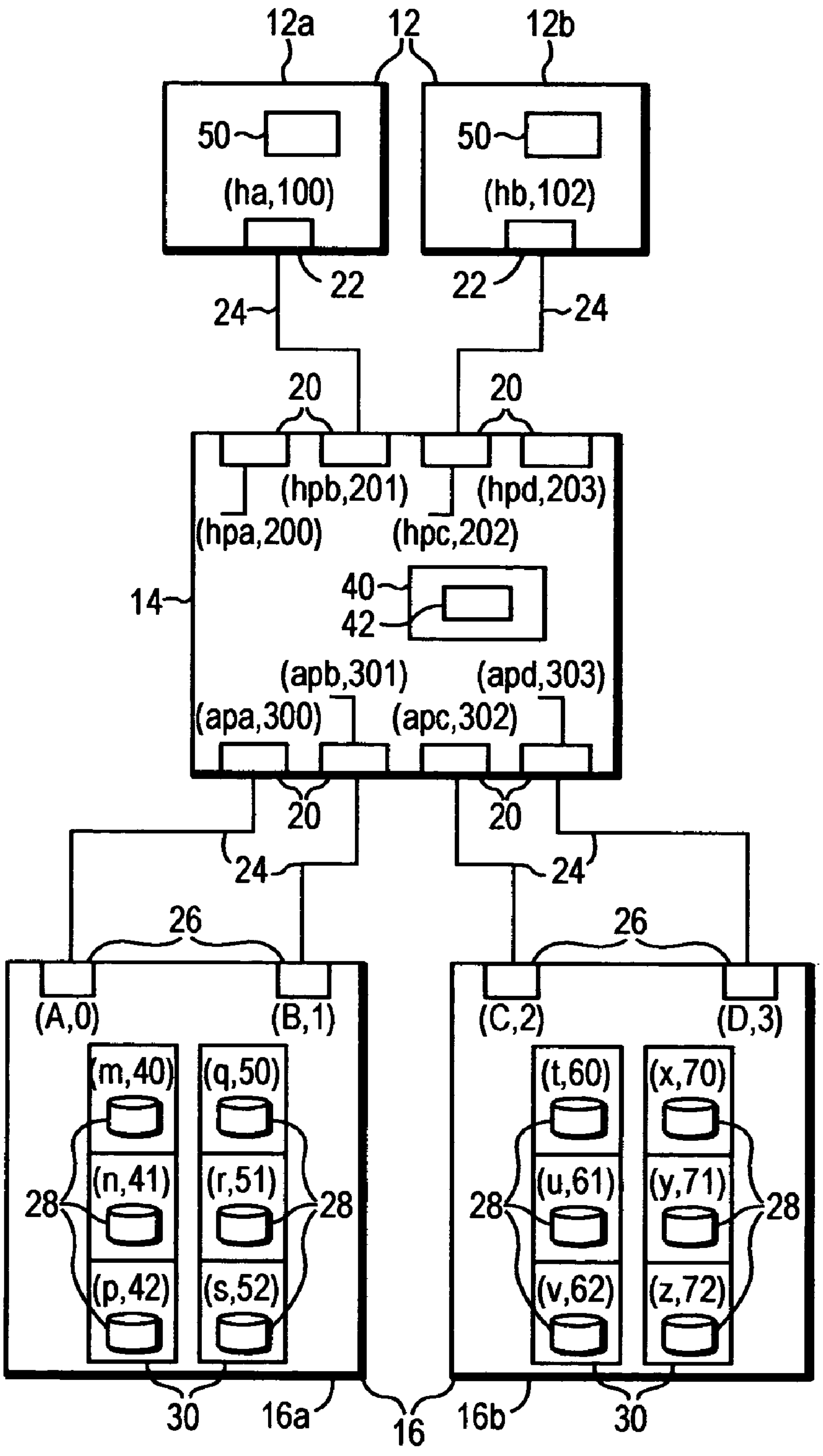
FIG. 2 is a representation of the storage area network of FIG. 1, showing two hosts, the fabric, and two storage arrays in more detail.

In FIG. 2 the hosts 12*a,b*, the arrays 16*a,b*, and the switch 14 are shown in more detail. The switch includes switch ports 20. Host ports 22 on the hosts are coupled via Fibre Channel links 24 to host-facing switch ports 20 on the switch 14. Array ports 26 on the arrays 16 are coupled via Fibre Channel links 24 to array-facing switch ports 20 on the switch 14. Within each array 16 are arrays of disks 28. The disks are arranged into LUNs 30. The LUNs are exported by the arrays 16 for access by the hosts 12 via the fibre channel links 24 and switch 14. As herein shown, each disk is configured as a separate LUN, though it is understood that a LUN can encompass part of a disk, or parts of multiple disks, or multiple complete disks. The arrangement shown is chosen for convenience of description.

In a Fibre Channel system such as that of FIG. 2, each Fibre Channel device (including but not limited to host ports, array ports, and LUNs) has two identifying characteristics—a name and an address. Fibre Channel names, known as "world wide names", are unique—every Fibre Channel device in the world has its own unique name. Each Fibre Channel device in a system also has an address, referred to in Fibre Channel parlance as an "ID", that is dynamic and dependent upon the configuration of the system. The IDs are used for directing information between hosts and arrays and LUNs in the system. Port addresses are commonly referred to as "port IDs". After initialization, the hosts 12 communicate with the arrays 16 and LUNs 30 by sending messages to the appropriate port and LUN addresses. The hosts adapt to new addresses, but devices in use must maintain the same name in order for uninterrupted communications to continue.

In a Fabric topology, the switch assigns IDs to the host ports 22 and array ports 26 during initialization. IDs as described in the Fibre Channel specification are 24 bit quantities containing several fields. For purposes of this description, it is sufficient to understand that the ID assigned to an array port 26 is a derivative of the switch 14 name and the switch port 20 ID. Thus an array port 26 name depends on the switch port 20 to which it is coupled. In the Figures the names and IDs are shown symbolically with alphanumeric symbols for simplicity of explanation. In FIG. 2, the names and IDs of each port and LUN are shown as a pair (name, ID). Each host port 22 is shown to have a name and an ID (ha, 100) and (hb, 102). The host-facing switch ports 20 are shown to have names and IDs (hpa, 200), (hpb, 201) coupled to a host port 22 on the host 16*a*, (hpc, 202) coupled to a host port 22 on the host 16*b*, and (hpd, 203). Array-facing switch ports 20 also have a name and ID. The array-facing switch ports 20 are shown to have names and IDs (apa, 300) coupled to an array port 26 on the array 16*a*, (apb, 301) coupled to an array port 26 on the array 16*a*, (apc, 302) coupled to an array port 26 on the array 16*b*, and (apd, 303), coupled to an array port 26 on the array 16*b*. Each array port 26 is also shown to have a name and an ID. The array 16*a* includes array ports 26 having names and IDs (A,0) and (B,1). The array 16*b* includes array ports 26 having names and IDs (C,2) and (D,3). Each LUN 30 in each array also has a name and a LUN number, referred to as a name/number pair (LUN name, LUN number). The array 16*a* includes LUNs (m,40), (n,41) and (p,42) accessible via port (A,0), and LUNs (q,50), (r,51) and (s,52) accessible via port (B,1). The array 16*b* includes LUNs (t,60), (u,61) and (v,62) accessible via port (C,2), and LUNs (x,70), (y,71) and (z,72) accessible via port (D,3). It is noted that some LUNs may have more than one LUN number, for purposes of LUN access by multiple hosts via multiple array ports. However, for clarity of the present description, each LUN has one LUN number.

The Fibre Channel switch 14 includes a name server database 40. The name server database 40 is used by the switch 14 to assign IDs to host ports 22 and array ports 26 during initialization. The name server database 40 includes a name server table 42 that is used by the switch to resolve IDs to names. An example of the name server table 42 is shown in more detail in FIG. 3. The full contents of the name server table 42 are described in the Fibre Channel Name Server MIB, described in the IETF RFC 4044, "Fibre Channel Management MIB", herein incorporated by reference. FIG. 3 shows only enough of the table 42 to contribute to understanding of the invention. The table 42 includes multiple entries 44, each including a port name field 46 and a port address field 48. During initialization, a Fibre Channel device attached to a switch port, for example the array 16*a*, sends its array port 26 names to the switch 14. In response, the name server database 40 sends an ID for each array port 26 to the array 16*a*. The name server database 40 stores each array port name and corresponding ID in an entry 44 in the table 42. In FIG. 3, the table 42 includes entries 44 for the port names A and B from the array 16*a*, and C and D from the array 16*b*. The IDs 0 and 1 have been assigned to the port names A and B, and the IDs 2 and 3 have been assigned to the port names C and D. After the arrays 16*a* and 16*b* are initialized, the switch 14 sends the table 42 to all members of the SAN 10 registered to received state change notifications. This includes the hosts 12. The hosts 12 now have the IDs of the arrays 16 so Fibre Channel communications between the hosts 12 and arrays 16 can ensue.

Now that the hosts have IDs to access the ports, they can learn what LUNs are available. LUN names and numbers are managed at the array level. Each host 12 sends a query to each array port 26 ID in turn, requesting a list of available LUN numbers. Once the LUN numbers for a given array port ID are known, the host is able to query each LUN 30 by using a combination of the port ID and LUN number to access the LUNs. The host 12 then queries each LUN 30 for its corresponding LUN name. Once the host has gathered all this information, it builds a directory LUN table 50 that relates LUN names, port IDs, and LUN numbers. A representation of such a LUN table 50 is shown in FIG. 4. The table includes an entry 52 for each LUN it has discovered. Each entry includes a LUN name field 54, a port ID field 58 and a LUN number field 60, which in combination identify the LUN. In the portion of the table shown, the table 50 for a host 12 includes the LUN names, port IDs, and LUN numbers for the LUNs 30 on the array 16*a* and the LUNs 30 on the array 16*b*. For example, the LUNs 30 associated with the array port 26 address 0 are (m, 40), (n, 41), (p, 42).

During operation, hosts refer to LUNs by their LUN numbers. In order to access a LUN 30, a host 12 port 22 sends a message whose Fibre Channel address includes the port ID and LUN number. The switch 14 parses the port ID portion of the address in order to forward the message to the identified array port 26. The array 16 then uses the LUN number portion of the address to access the proper LUN 30 within the array 16. So, for example, if host 12*a* needs to access LUN #62, the host 12*a* port 22 sends a message to an address including the port ID 2 and the LUN number 62. The switch 14 sees the port ID 2 and sends the message to the port 26 with ID 2. The array sees the LUN #62 and sends the message from port 2 to LUN 62.

In accordance with the principles of the invention, all the data on one array 16, referred to as the source array, is migrated to another array 16, referred to as the destination array, in a manner transparent to the hosts 12 and any applications hosted thereon. For purposes of example the source array shall be array 16*a*, and the destination array shall be array 16*b*. First, remote replication software copies the data from the source array 16*a* to the destination array 16*b* and synchronizes the arrays. Then, the Fibre Channel connections for each array 16*a, b* are exchanged. According to an implementation of the exchange, the array port names and LUN names and numbers are swapped between the arrays, and the swapped array port names and LUN names and numbers are then enabled. In response to the configuration change, the switch 14 builds a new name server database 40 table 42 reflecting the new array port and name associations, and prompts the hosts 12 to upload the new table 42. The hosts 12 then query each of the arrays 16*a,b* to learn the new LUN name and address associations. The data and connections have thereby been migrated from the source array 16*a* to the destination array 16*b* transparently, with no interruption to applications running on the hosts 12. This is because, from the hosts' perspective, though the addresses of the array ports 26 have changed, the array port names and LUN numbers have not.

Figure 5:
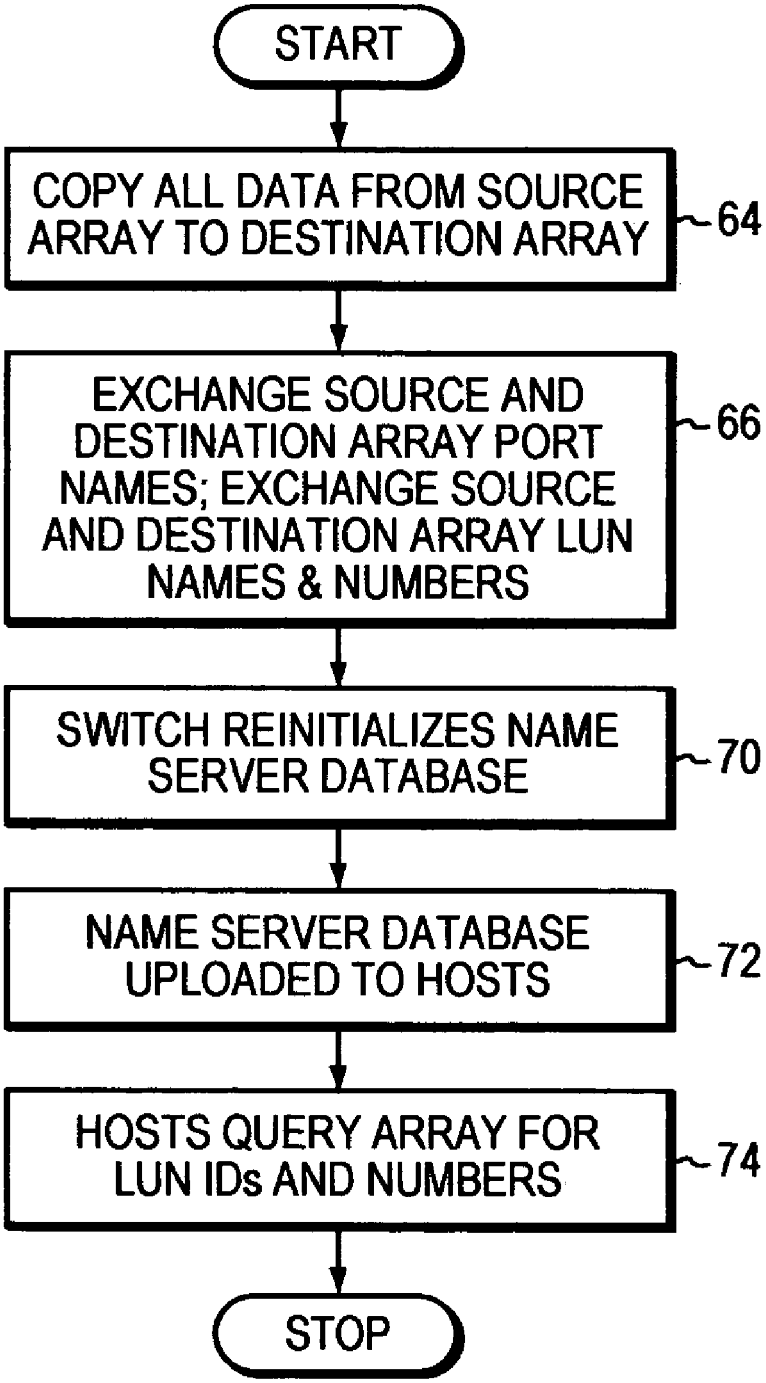
FIG. 5 is a flow diagram representing the high level process of the invention.

The general process by which a complete migration occurs from the source array 16*a* to the destination array 16*b* in a manner transparent to the hosts is shown in FIG. 5. First, the data is copied from the source array 16*a* to the destination array 16*b* (step 64). Then, the Fibre Channel names of the array ports 26 on the source array 16*a* are exchanged with the names of the array ports on the destination array 16*b*, and, the source array LUN names and numbers are exchanged with the destination LUN names and numbers (step 66). Once the port name and LUN name and number exchanges are complete, the switch notes the configuration change and reloads its name server database in response (step 70). The hosts upload the updated name server database (step 72). The hosts then query the arrays 16*a,b* for LUN IDs and LUN names (step 74). As will be shown, from the hosts' perspective, all the LUNs it was able to address previously remain continuously addressable, and no names have changed. In this manner, all the LUNs from the source array 16*a* have been migrated to the destination array 16*b*, in a manner transparent to the hosts 12.

Figure 6:
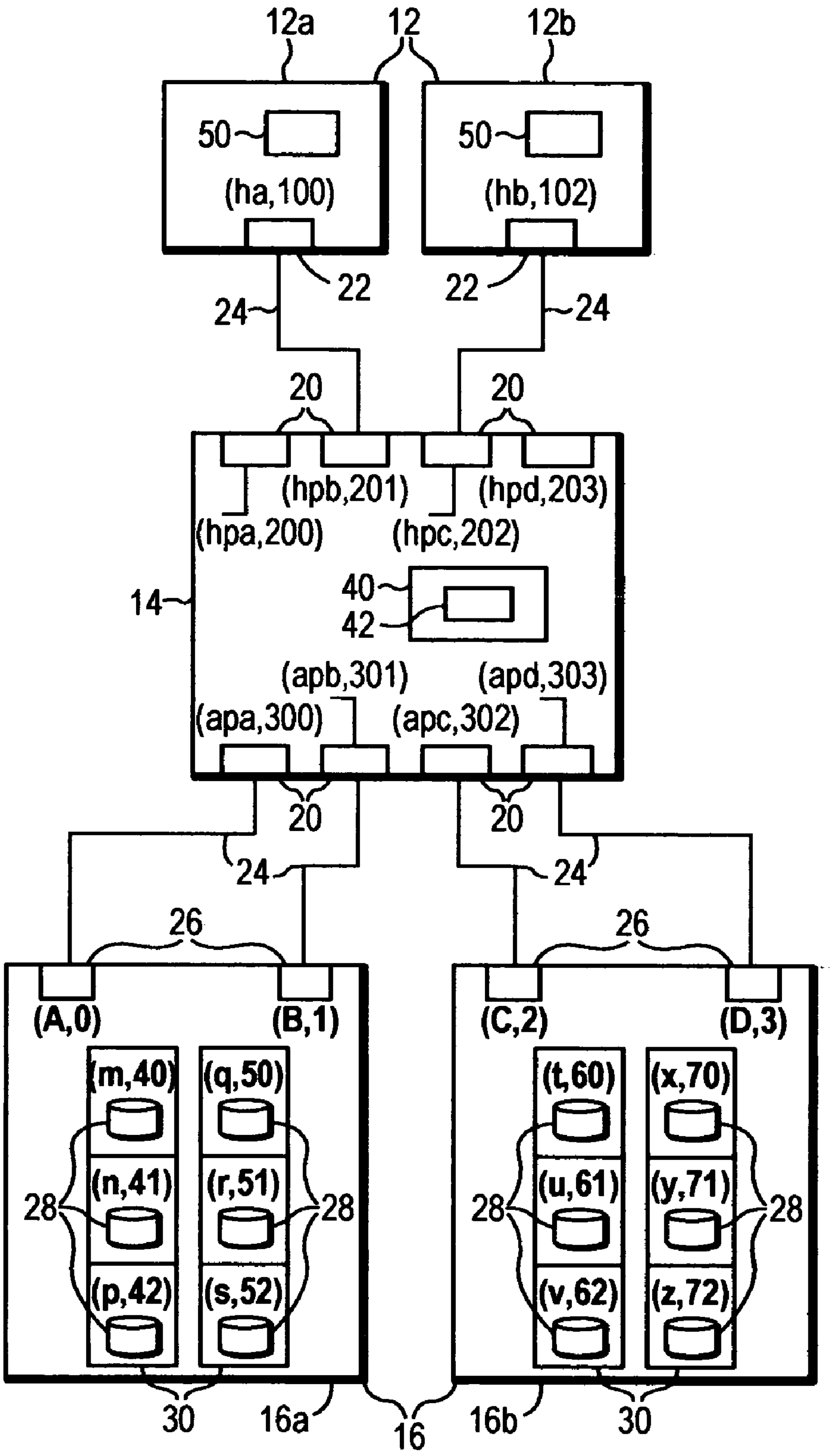
FIG. 6 is a representation of the system of FIG. 2, emphasizing port names and IDs and LUN names and numbers.
Figure 7:
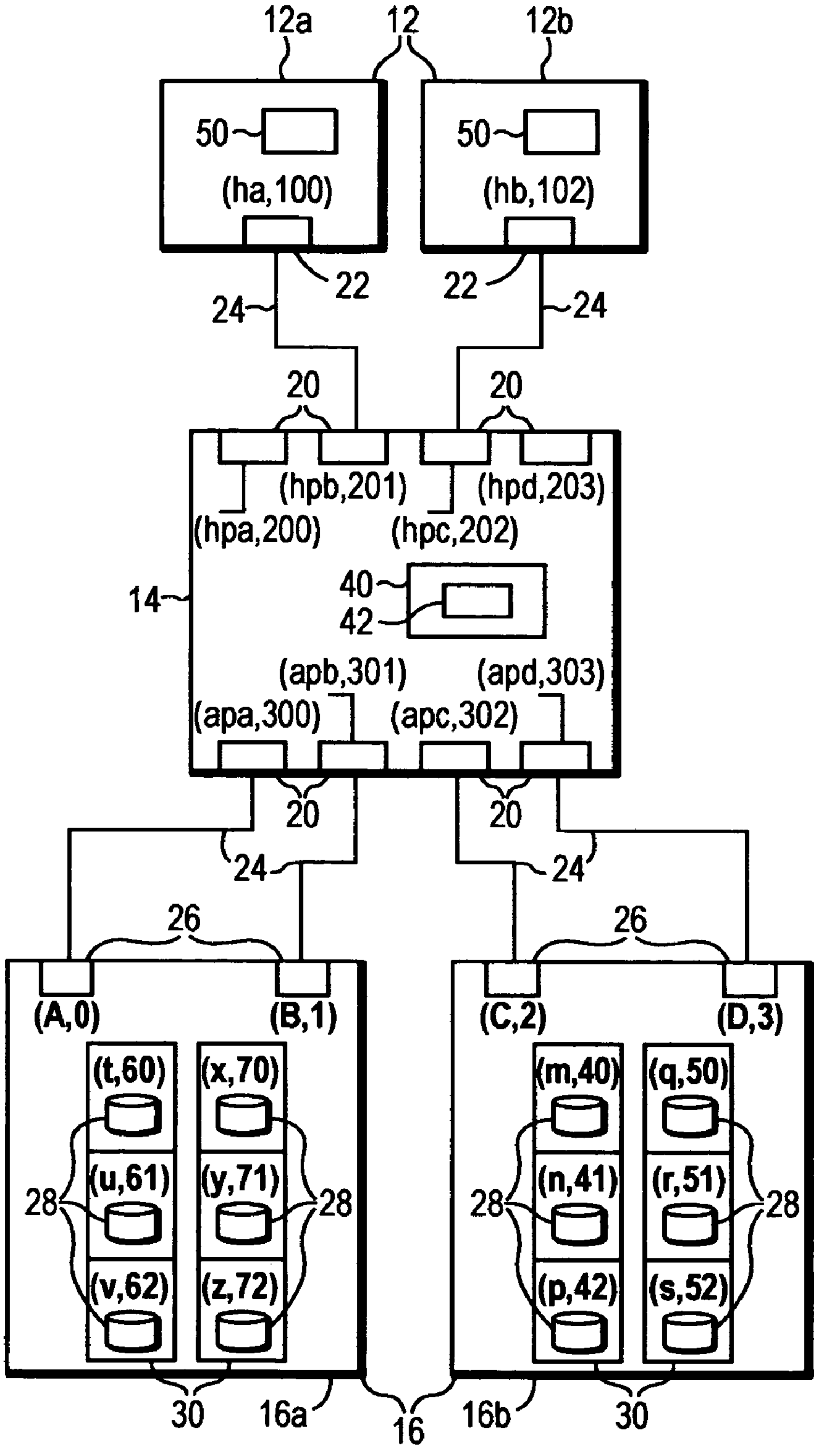
FIG. 7 is a representation of the system of FIG. 6 in which the invention has been employed to exchange port names and LUN names and numbers between arrays.

FIGS. 6 and 7 represent the names and IDs of arrays and LUNs before and after a migration. FIGS. 8 and 9 show contents of the name server database table 42 before and after the migration. FIGS. 10 and 11 show contents of the LUN tables 50 in the hosts 12, before and after the migration.

In FIGS. 6 and 7, the system configuration of FIG. 2 is shown, with relevant port and LUN addresses and IDs in bold font. In FIG. 6, the source and destination array port names and IDs and LUN names and numbers are shown before migration. In FIG. 7, they are shown after migration. Note that the array port names and LUN names and numbers have been exchanged between the source array 16*a* and destination array 16*b*.

In FIG. 8, the name server database table 42 is shown as it is built by the switch 14 before the migration. In this case, the table 42 associates array port names A, B, C, D with IDs 0, 1, 2, 3 respectively (same as shown in FIG. 3). FIG. 9 shows the table 42 after the name exchange (FIG. 5 step 66). The table 42 now associates the array port 26 names A, B, C, D with IDs 2, 3, 0, 1 respectively.

The updated name server database 40 now prompts the hosts 12 to query the arrays 16 for their LUN information. FIGS. 10 and 11 show examples of LUN tables 50 as built by a host 12 before and after the migration. Before the name exchange, the LUN table 50 associates LUN names with port ID and LUN number pairs as shown in FIG. 10. After the LUN name exchange, the LUN table 50 associates LUN names with port IDs and LUN numbers as shown in FIG. 11. Note that LUN name m now appears on port ID/LUN number (2,40), and LUN name t now appears on port ID/LUN number (0,60).

Figure 12:
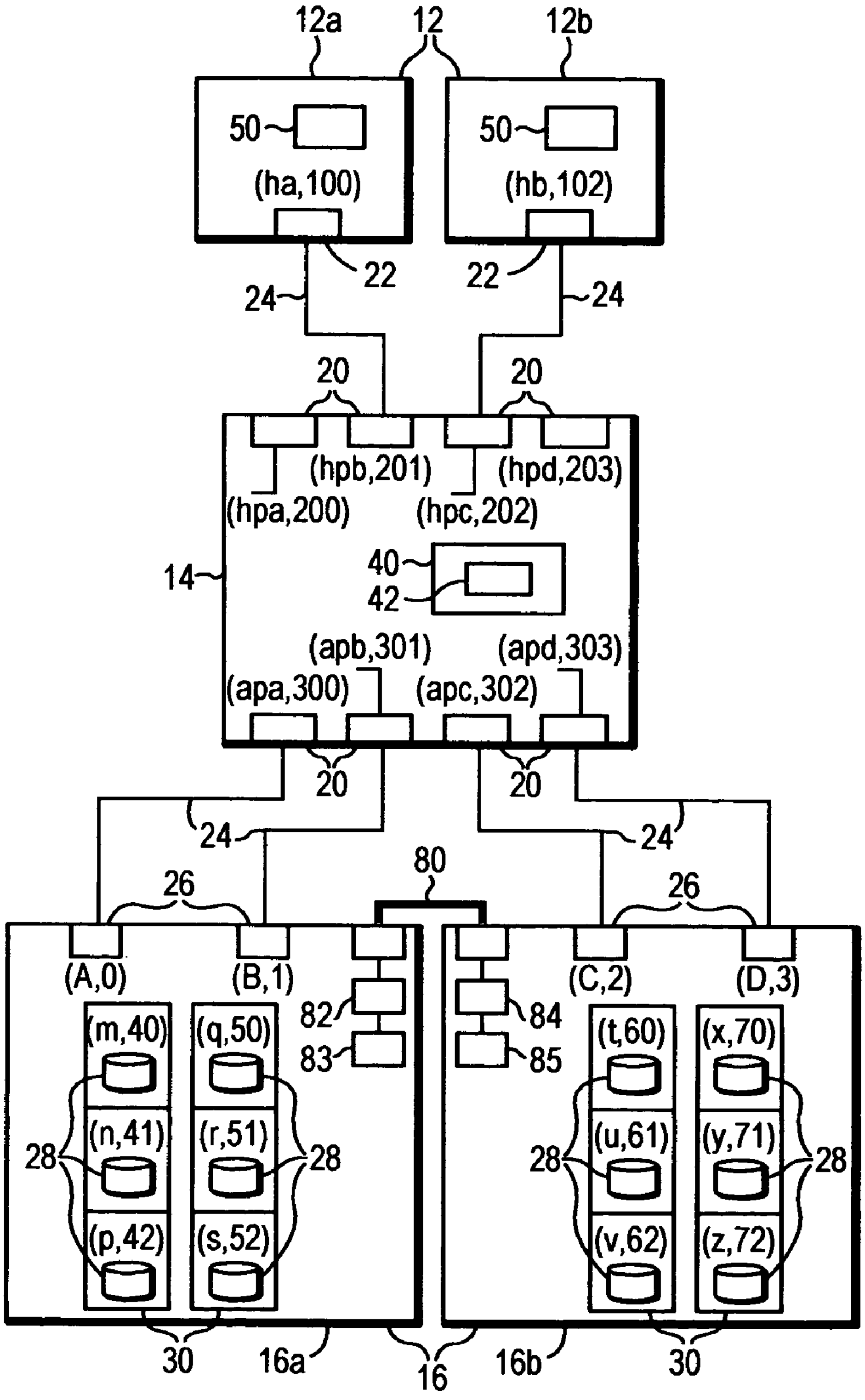
FIG. 12 is a representation of the system of FIG. 6, further showing the source and destination controllers and the translation tables.

An embodiment of the invention is now described in further detail. In FIG. 12, The source and destination arrays 16*a* and 16*b* are shown connected by a point-to-point link 80. This link could also pass through the switch 14, but for purposes of simplicity is shown as a simple point-to-point connection between the arrays 16*a,b*. The link 80 is used for transferring copy data and messages between the arrays 16. The source array 16*a* is shown to include a source array controller 82 coupled to translation tables 83. The destination array is shown to include a destination array controller 84 coupled to translation tables 85.

The data copy function (FIG. 5 step 64) can be performed by any remote replication software. Data migration products called MirrorView and SRDF/S (Symmetrix Remote Data Facility), both of EMC Corp. of Hopkinton, Mass., are examples of remote replication software that can be conveniently used. The remote replication software sets up a primary mirror, and copies that mirror and all updates to a secondary mirror.

Figure 13:
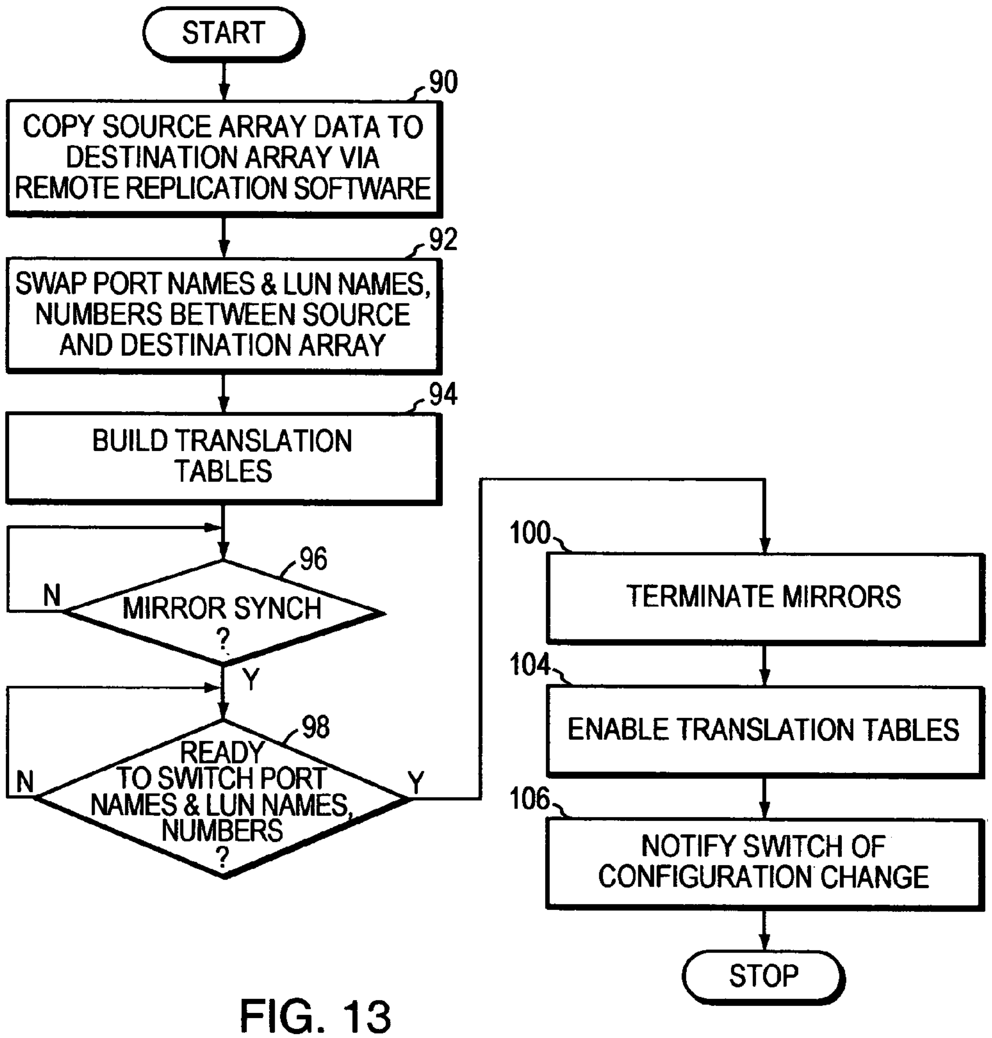
FIG. 13 is a flow diagram of the general operation of the controllers 82 and 84 in combination.

The source array controller 82 and destination array controller 84 work together to generally perform the port name and LUN name and ID exchange process (FIG. 5 step 66) shown in FIG. 13. Accordingly, remote replication software is invoked to copy all the source array data to the destination array (step 90) via the dedicated link 80. Meanwhile, array port names, LUN names, and LUN numbers are swapped between the source and destination arrays, also via the link 80 (step 92). Each array 16*a,b* builds one or more translation tables 83, 85 to map its current port names, LUN names, and LUN numbers to new port names, LUN names, and LUN numbers (step 94). Once the remote replication process indicates synchronization of the arrays (step 96), the arrays perform a handshake function to see whether both arrays are ready to switch their port names and LUN names and numbers (step 98). When both arrays are ready, the mirror process is terminated (step 100). each array's translation tables are then activated (step 104), causing the new port and LUN numbers to be used by the arrays 16 and thereby completing the exchange. The switch 14 is then notified of the configuration change (step 106), causing it to rebuild its name server database table 42. Hosts 12 then upload the new table 42 and proceed to query the arrays 16 for LUN names and LUN numbers to rebuild their LUN tables 50.

In accordance with an embodiment, the configuration change is indicated by causing the switch 14 to recognize a "link bounce". A link bounce causes temporary inaccessibility of the arrays. The link bounce is transparent to the hosts 12. In accordance with Fibre Channel protocol, the switch 14 responds to the link bounce by re-building its name server database table 42 and sending it to all registered SAN devices. A link bounce may be caused for example by quickly disabling and re-enabling a Fibre Channel transmitter. It is understood, however, that the configuration change can be implemented in other manners. For example, the destination array 16*b* could cause a logout and subsequent login; or, a temporary I/O glitch could be caused. The invention can be implemented using any means for causing the switch to recognize the configuration change.

Figure 14:
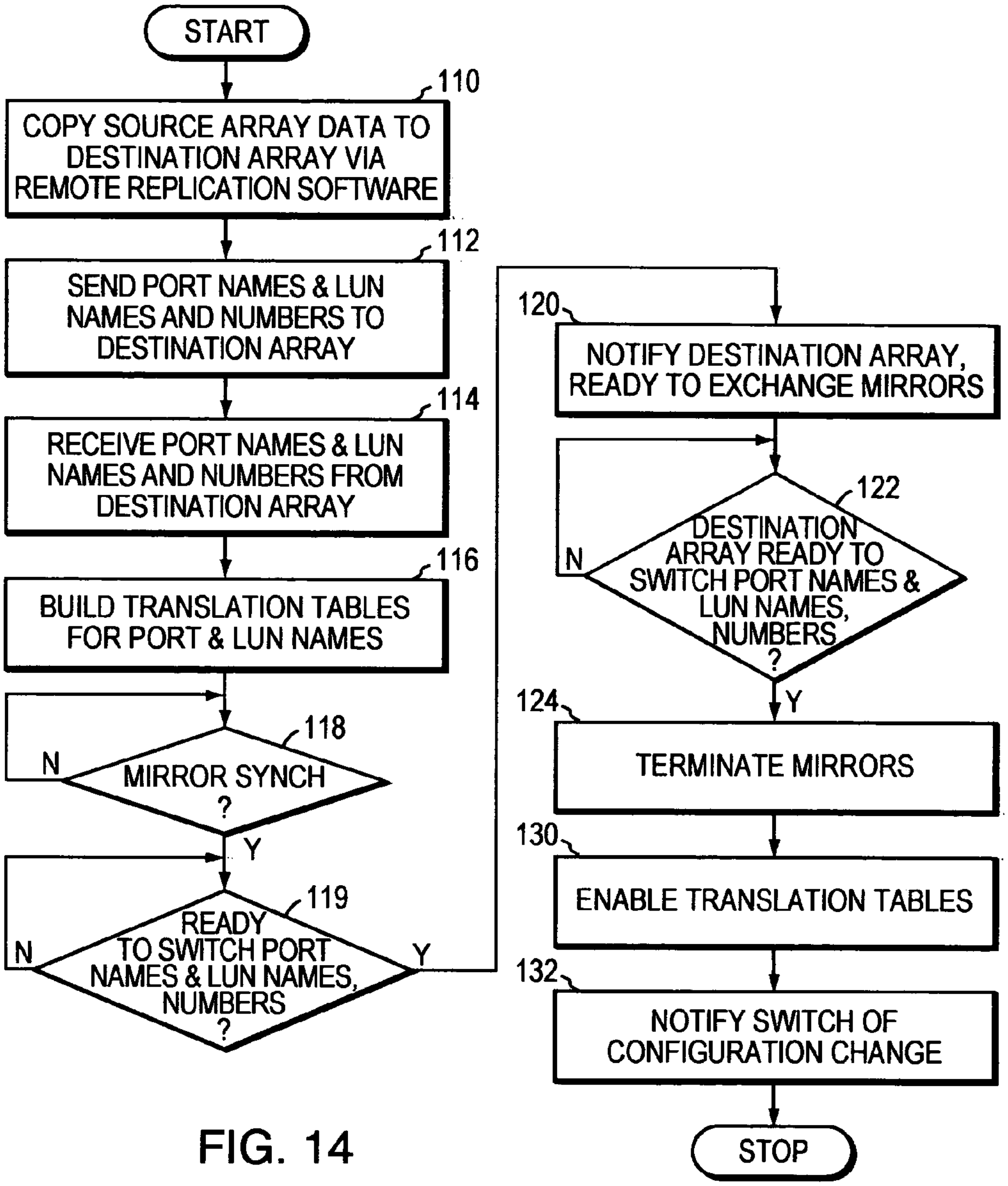
FIG. 14 is a flow diagram of the operation of the source array and controller.

In the preferred embodiment shown in FIG. 12, the functionality of FIG. 13 is distributed between the source array controller 82 and the destination array controller 84. In FIG. 14, the operation of the source controller 82 is shown. First, the remote replication software is invoked to copy the source array 16*a* data to the destination array 16*b* (step 110). While the data is being copied, the controller 82 sends its port names and LUN names and numbers to the destination array 16*b* controller 84 via the point-to-point link 80 (step 112). The controller is also receiving port names and LUN names and numbers from the destination array (step 114). The source controller 82 uses the port names and LUN names and numbers received from the destination controller 84 to build translation tables 83 for the port names and LUN names and numbers. The translation tables 83 include port name translation table 83*a*, LUN name translation table 83*b*, and LUN number translation table 83*c*. An example of a port name translation table 83*a* is shown in FIG. 15. The table 83*a* includes an entry for each port on the array 16*a*. Each entry contains the current port name, and one of the new port names received from the destination array 16*b*. Two entries exist in the port name translation table 83*a* shown in FIG. 15. The first associates the source array port name A with the destination array port name C. The second associates the source array port name B with the destination array port name D. The LUN name translation table 83*b* includes an entry for each LUN. Each entry includes the current LUN name and a new LUN name received from the destination array 16*b*. An example of a LUN name translation table is shown in FIG. 16. In this example, six entries exist in the LUN translation table. The current source array LUNs m, n, p, q, r, s are associated with the current destination array LUN names t, u, v, x, y, z. An example of a LUN number translation table is shown in FIG. 16. In this example, six entries exist in the LUN number translation table. The current source array LUN numbers 40, 41, 42, 50, 51, 52 are associated with the current destination array LUN numbers 60, 61, 62, 70, 71, 72 respectively. (It will be clear to the skilled artisan that the information in the tables 83 can be stored as one table, or separate tables, in accordance with design requirements and convenience.)

Referring back to FIG. 14, after the translation tables 83 have been built, the source controller 82 checks to see if the remote replication software has synchronized the two arrays yet (step 118). If no mirror synch signal has been received, the controller 82 waits until mirror synch occurs (step 118). Now, the source controller 82 checks to make sure it is ready to switch its port names and LUN names and numbers (step 119). If ready, the source controller 82 notifies the destination controller 84 that the source controller 82 is ready to switch port and LUN names (step 120), and checks to see if the destination controller 84 is also ready to switch port names and LUN names and numbers (step 122). If not, the controller 82 waits. When the destination array indicates it is ready, the source controller terminates the mirror process (step 124) and enables its port and LUN translation tables (step 130). Now the source array port names, LUN names, and LUN numbers are replaced with the array port names, LUN names and LUN numbers that were received from the destination array 84. A link bounce then occurs to notify the switch of the configuration change (step 132). Now the previously described switch name server database update and host queries occur. The hosts now see the same port names, LUN names, and LUN numbers they saw before, but at different port IDs.

Figure 18:
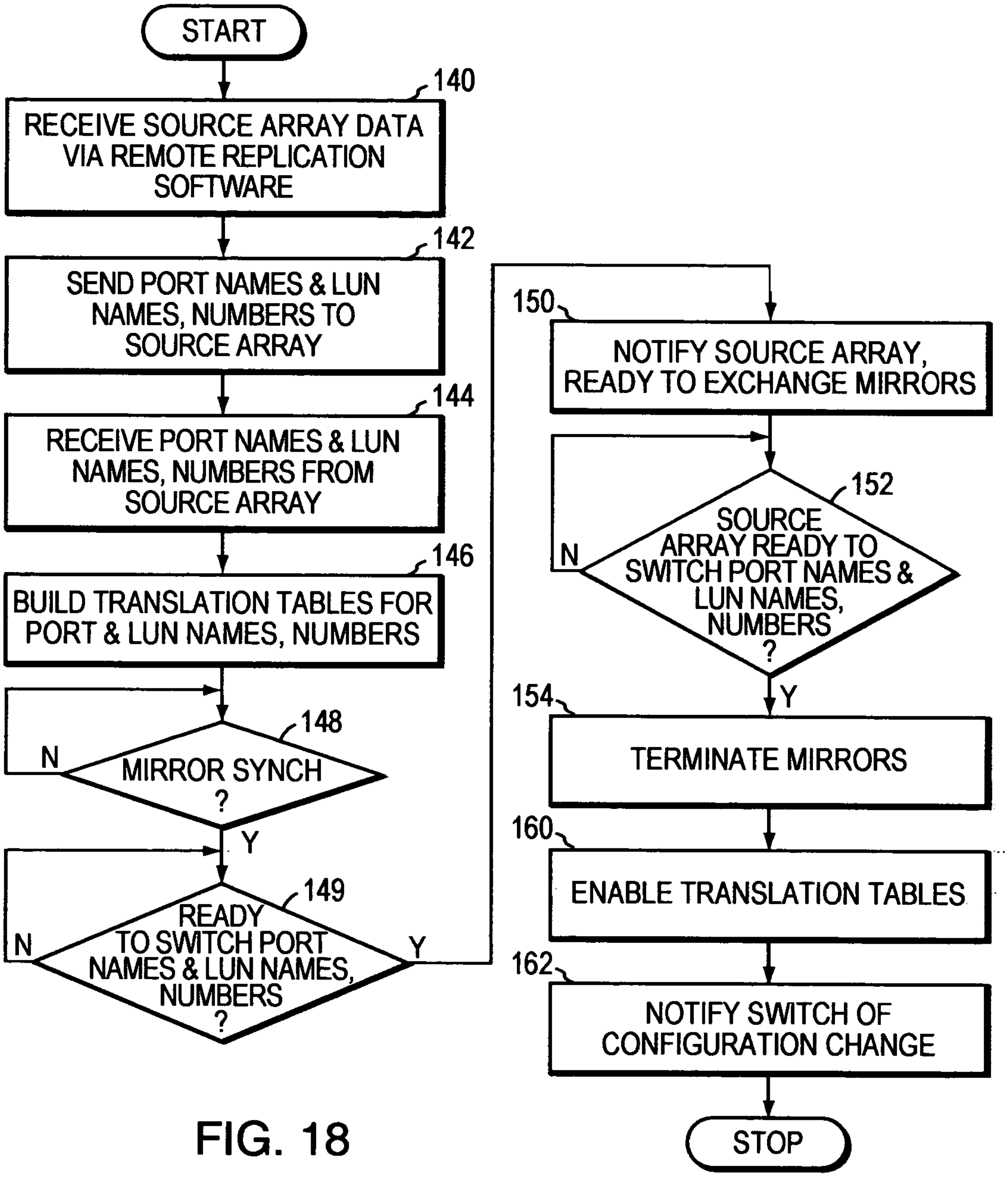
FIG. 18 is a flow diagram of the operation of the destination array and controller.

In FIG. 18, the operation of the destination controller 84 is shown. First, the remote replication software is invoked to receive the data from the source array (step 140). While the data is being copied, the destination controller 84 sends it port names, LUN names, and LUN numbers to the source array 16*a* via the point-to-point link 80 (step 142). The controller 84 is also receiving port names, LUN names, and LUN numbers from the source array 16*a* controller 82 via the link (step 144). The destination controller 84 uses the port names, LUN names, and LUN numbers received from the source array controller 82 to build translation tables 85 for the port names, LUN names, and LUN numbers. An example of a port name translation table 85*a* is shown in FIG. 19. The table includes an entry for each port on the array 16*b*. Each entry contains the current port name, and one of the new port names received from the source array. In this example, two entries exist in the port translation table 85*a*. The first associates the destination array port name C with the source array port name A. The second associates the destination array port name D with the source array port name B. The LUN name translation table 85*b* includes an entry for each LUN. Each entry includes the current LUN name and a new LUN name received from the source array. An example of a LUN name translation table 85*b* is shown in FIG. 20. In this example, six entries exist in the LUN name translation table 85*b*. The current destination array LUNs t, u, v, x, y, z are associated with the current source array LUN names m, n, p, q, r, s. The LUN number translation table 85*c* also includes an entry for each LUN. Each entry includes the current LUN number and a new LUN number received from the source array. An example of a LUN number translation table 85*c* is shown in FIG. 21. In this example, six entries exist in the LUN name translation table 85*c*. The current destination array LUNs 60, 61, 62, 70, 71 and 72 are associated with the current source array LUN numbers 40, 41, 42, 50, 51, 52 respectively.

Figure 22:
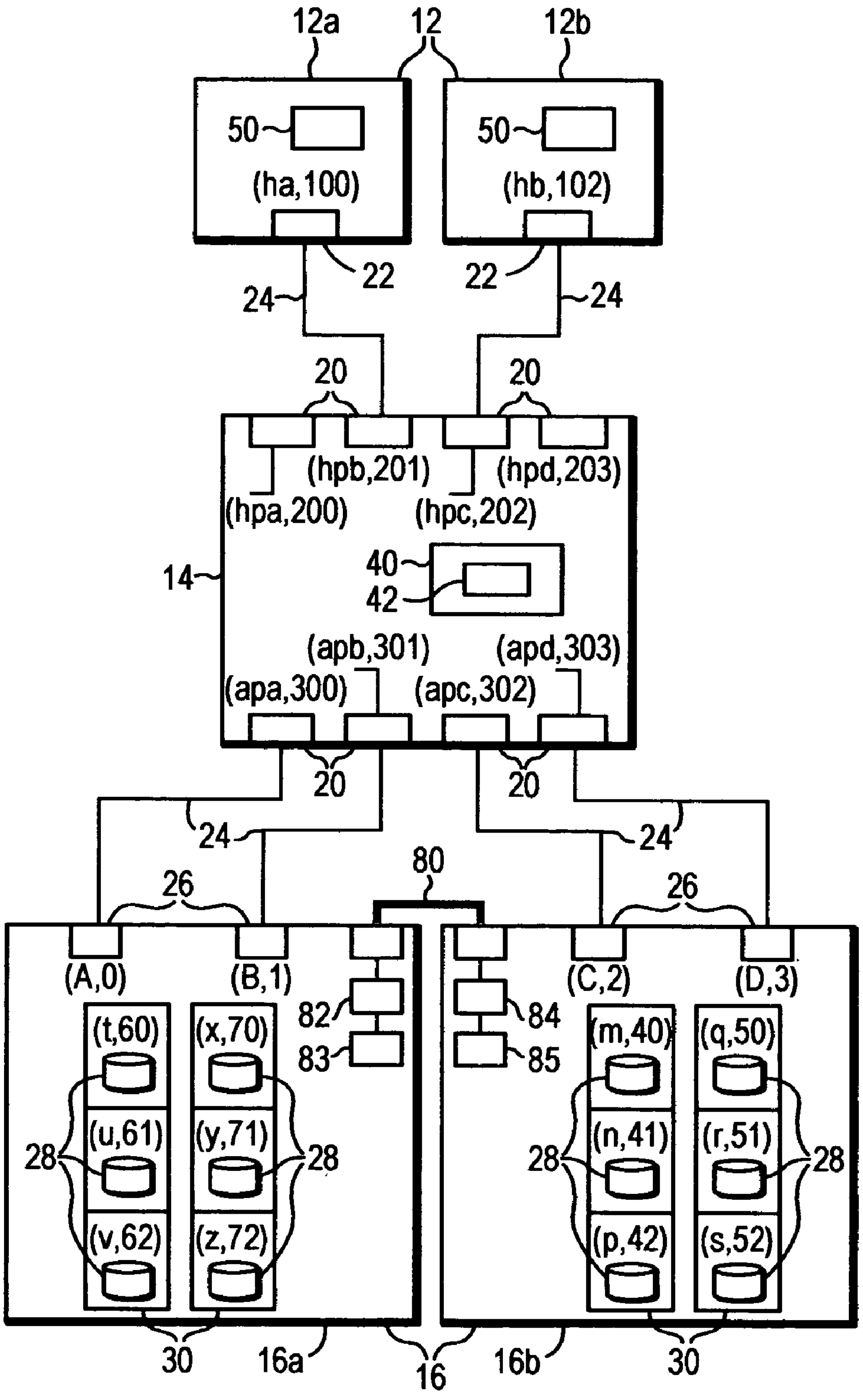
FIG. 22 is a representation of the system of FIG. 12 after the port and LUN names have been exchanged between the arrays.

Referring back to FIG. 18, after the translation tables have been built, the destination controller 84 checks to see if the remote replication software has synchronized the two arrays yet (148). If no mirror synch signal has been received, the controller 84 waits until mirror synch occurs (step 148). Now the destination controller 84 checks to see if it is ready to switch port names and LUN names and numbers (step 149). If so, the controller 84 notifies the source controller 82 that the destination controller 84 is ready to exchange port names and LUN names and numbers (step 150), and checks to see if the source array controller 82 is also ready to switch port and LUN names and LUN numbers (step 152). If not, the controller 84 waits. When the source array indicates it is ready, the destination controller terminates the minor process (step 154) and enables its port and LUN translation tables (step 160). Now the destination array port IDs and LUN names and numbers are replaced with the array port IDs and LUN names and numbers that were received from the source array. A link bounce then occurs to notify the switch of the configuration change (step 162). Now the previously described switch name server database update and host queries occur. The hosts 12 now see the same LUNs they saw before, but at different port IDs. The storage system configuration now seen by the hosts is shown in FIG. 22. The destination array 16*b* is now seen by the host as the source array.

Now that the source array has been migrated to the destination array, the array 16*a* can continue in its current configuration as a secondary mirror, or its LUNs can be presented to the hosts 12 as new LUNs.

FIGS. 14 and 17 set forth one of many possible embodiments for controlling the copy function and name and number exchange functions. The actions need not necessarily be performed in the order shown. For example, the array controllers 82 and 84 could wait until the remote replication process is synchronized before name and number exchanges occur. Furthermore, instead of using translation tables to implement the name and number switch, the names of the ports and LUNs could simply be replaced. The invention encompasses all the various ways of performing the copy and name and number exchange functions. The arrays 16*a* and 16*b* have been presented as identical—that is, they have the same number of ports, and the same number and configuration of LUNs. This is preferable. A destination array that is larger, or a superset, of the source array could also be employed. This is one manner in which to upgrade array capacity.

Furthermore, in some implementations it is not necessary to exchange the LUN numbers between the source and destination arrays 16*a* and 16*b*. Some remote replication software applications (for example Mirror View) provide the required LUN number information. In this case, only the LUN names need be exchanged. The prior description describes the exchange of both LUN names and LUN numbers for completeness, with the understanding that the invention may be implemented by exchange of port and LUN names only.

The present invention is not to be limited in scope by the specific embodiments described herein. Various modifications of the present invention, in addition to those described herein, will be apparent to those of ordinary skill in the art from the foregoing description and accompanying drawings. Though the invention is applied herein to a storage system containing LUNs, it can be applied to any device or devices that implement a transport using unique names and dynamic addresses. One skilled in the art will understand that many specific implementations can be employed to achieve the logical functionality of the invention. For instance, a distributed control function operating at the device level has been shown, but the control function can be centralized and/or can reside in places other than the devices. All such modifications are intended to fall within the scope of the invention. Software maybe embodied on any known non-transitory computer readable medium having embodied therein a computer program for storing data. In the context of this document a computer readable storage medium ma be an tangible medium that can contain, or store a program for use by or in connection with an instruction execution system, apparatus, or device. A computer readable storage medium may be, for example, an electronic, magnetic, optical, electromagnetic, infrared, or semiconductor system, apparatus, or device, or any suitable combination of the foregoing. More specific examples of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the following. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. Apparatus for use in a storage system comprising a fibre channel fabric having a database that associates fibre channel names and fibre channel addresses of fibre channel ports coupled to it, the database usable by one or more hosts that use fibre channel addresses to communicate with fibre channel devices, the database used by the host(s) for learning fibre channel name and address associations, the apparatus comprising:

- a source fibre channel device having one or more source ports coupled to the fibre channel fabric, each source port having a source port name and a source port address;
- a destination fibre channel device having one or more destination ports coupled to the fibre channel fabric, each destination port having a destination port name and a destination port address;
- software for copying all data resident on the source fibre channel device to the destination fibre channel device;
- software for exchanging the source port names with the destination port names so that the source ports have the destination port names and the destination ports have the source port names;
- software for causing the fabric to reload its database for use by the host(s) so that the database associates the source port names with the destination port addresses and the destination port names with the source port addresses, such that the names known to the host have not changed and the destination fibre channel device now appears to the host as the source fibre channel device.

2. The apparatus of claim 1 wherein the source fibre channel device is a source storage array and the destination fibre channel device is a destination storage array.

3. The apparatus of claim 2 wherein the source storage array exports source LUNs for use by the host(s), each source LUN having a source LUN name and source LUN number, and wherein the destination storage array exports destination LUNs for use by the hosts, each destination LUN having a destination LUN name and a destination LUN number, and wherein the logic for exchanging further comprises logic for exchanging the source LUN names with the destination LUN names so that the source LUNs have the destination LUN names and the destination LUNs have the source LUN names, such that the destination LUNs appear to the host(s) as the source LUNs.

4. The apparatus of claim 3 wherein the logic for exchanging further comprises logic for exchanging the source LUN numbers with the destination LUN numbers so that the source LUNs have the destination LUN numbers and the destination LUNs have the source LUN numbers, such that the destination LUNs appear to the host(s) as the source LUNs.

5. The apparatus of claim 4 wherein the source and destination storage arrays comprise source and destination port translation tables respectively; the source port translation table associating the source port names with the destination port names, the destination port translation table associating the destination port names with the source port names, the source and destination port translation tables used by the logic for exchanging for replacing the source and destination port names with the destination and source port names respectively.

6. The apparatus of claim 5 wherein the source and destination storage arrays comprise source and destination LUN translation tables respectively; the source LUN translation table associating the source LUN names and numbers with the destination LUN names and numbers, the destination LUN translation table associating the destination LUN names and numbers with the source LUN names and numbers;

the source and destination LUN translation tables used by the logic for exchanging for replacing the source and destination LUN names and numbers with the destination and source LUN names and numbers respectively.

7. The apparatus of claim 6 wherein the apparatus for exchanging comprises a source controller in the source array and a destination controller in the destination array, the source controller capable of enabling the source port and source LUN translation tables, the destination controller capable of for enabling the destination port and destination LUN translation tables.

8. The apparatus of claim 7 wherein the source controller and destination controller enable the source and destination port translation tables and source and destination LUN translation tables respectively in accordance with a handshake protocol.

9. A program product comprising a non-transitory computer readable medium having embodied therein a computer program for storing data, the computer program for operation in a system comprising:

a fibre channel fabric having a database that associates fibre channel names and fibre channel addresses of fibre channel ports coupled to it, the database usable by one or more hosts that use fibre channel addresses to communicate with fibre channel devices, the database used by the host(s) for learning fibre channel name and address associations;

a source fibre channel device having one or more source ports coupled to the fibre channel fabric, each source port having a source port name and a source port address;

a destination fibre channel device having one or more destination ports coupled to the fibre channel fabric, each destination port having a destination port name and a destination port address;

the program product comprising:

logic for copying all data resident on the source fibre channel device to the destination fibre channel device;

logic for exchanging the source port names with the destination port names so that the source ports have the destination port names and the destination ports have the source port names;

logic for causing the fabric to reload its database for use by the host(s) so that the database associates the source port names with the destination port addresses and the destination port names with the source port addresses, such that names known by the host have not changed and the destination fibre channel device now appears to the host as the source fibre channel device.

10. The program product of claim 9 wherein the source fibre channel device is a source storage array and the destination fibre channel device is a destination storage array.

11. The program product of claim 10 wherein the source storage array exports source LUNs for use by the host(s), each source LUN having a source LUN name and source LUN number, and wherein the destination storage array exports destination LUNs for use by the hosts, each destination LUN having a destination LUN name and a destination LUN number, and wherein:

the logic for exchanging further comprises logic for exchanging the source LUN names with the destination LUN names so that the source LUNs have the destination LUN names and the destination LUNs have the source LUN names, such that the destination LUNs appear to the host(s) as the source LUNs.

12. The program product of claim 11 wherein the source and destination storage arrays comprise source and destination port translation tables respectively; the source port translation table associating the source port names with the destination port names, the destination port translation table associating the destination port names with the source port names, the source and destination port translation tables used by the logic for exchanging for replacing the source and destination port names with the destination and source port names respectively.

13. The program product of claim 12 wherein the source and destination storage arrays comprise source and destination LUN translation tables respectively; the source LUN translation table associating the source LUN names and numbers with the destination LUN names and numbers, the destination LUN translation table associating the destination LUN names and numbers with the source LUN names and numbers, the source and destination LUN translation tables used by the logic for exchanging for replacing the source and destination LUN names with the destination and source LUN names respectively.

14. The program product of claim 13 wherein the logic for exchanging comprises source controller logic in the source array and destination controller logic in the destination array, the source controller logic capable of enabling the source port and source LUN translation tables, the destination controller logic capable of enabling the destination port and destination LUN translation tables.

15. The apparatus of claim 14 wherein the source controller logic and destination controller logic enable the source and destination port translation tables and source and destination LUN translation tables respectively in accordance with a handshake protocol.

16. A method for operation in a system comprising:

a fibre channel fabric having a database that associates fibre channel names and fibre channel addresses of fibre channel ports coupled to it, the database usable by one or more hosts that use fibre channel addresses to communicate with fibre channel devices, the database used by the host(s) for learning fibre channel name and address associations;

a source fibre channel device having one or more source ports coupled to the fibre channel fabric, each source port having a source port name and a source port address;

a destination fibre channel device having one or more destination ports coupled to the fibre channel fabric, each destination port having a destination port name and a destination port address;

the method comprising the steps of:

copying all data resident on the source fibre channel device to the destination fibre channel device;

exchanging the source port names with the destination port names so that the source ports have the destination port names and the destination ports have the source port names;

causing the fabric to reload its name server database for use by the host(s) so that the database associates the source port names with the destination port addresses and the destination port names with the source port addresses, such that the names known by the host have not changed and the destination fibre channel device now appears to the host as the source fibre channel device.

17. The method of claim 16 wherein the source fibre channel device is a source storage array and the destination fibre channel device is a destination storage array.

18. The method of claim 17 wherein the source storage array exports source LUNs for use by the host(s), each source LUN having a source LUN name and source LUN number, and wherein the destination storage array exports destination LUNs for use by the hosts, each destination LUN having a destination LUN name and a destination LUN number, and wherein the step of exchanging further comprises the step of:

exchanging the source LUN names with the destination LUN names so that the source LUNs have the destination LUN names and the destination LUNs have the source LUN names, such that the destination LUNs appear to the host(s) as the source LUNs.

19. The method of claim 18 wherein the source and destination storage arrays comprise source and destination port translation tables respectively; the source port translation table associating the source port names with the destination port names, the destination port translation table associating the destination port names with the source port names, the source and destination port translation tables used by the logic for exchanging for replacing the source and destination port names with the destination and source port names respectively.

20. The method of claim 19 wherein the source and destination storage arrays comprise source and destination LUN translation tables respectively; the source LUN translation table associating the source LUN names and numbers with the destination LUN names and numbers, the destination LUN translation table associating the destination LUN names and numbers with the source LUN names and numbers, the source and destination LUN translation tables used by the logic for exchanging for replacing the source and destination LUN names and numbers with the destination and source LUN names and numbers respectively.

21. The method of claim 20 wherein the source array includes a source controller and wherein the destination array includes a destination controller, the step of exchanging further comprising the steps of:

enabling by the source controller the source port and source LUN translation tables;

enabling by the destination controller the destination port and destination LUN translation tables.

22. The method of claim 21 wherein the source controller and destination controller enable the source and destination port translation tables and source and destination LUN translation tables respectively in accordance with a handshake protocol.

* * * * *